United States Patent [19]
de Coiselet (de F.)

[11] 4,427,086
[45] Jan. 24, 1984

[54] VEHICLE FITTED WITH AN AUXILIARY WHEEL FOR PROPELLING, GUIDING AND OR BRAKING THE VEHICLE

[76] Inventor: Claude de Coiselet (de F.), 50 Chemin de la Forêt, 78860 Saint Nom la Breteche, France

[21] Appl. No.: 219,570

[22] Filed: Dec. 24, 1980

[30] Foreign Application Priority Data

Dec. 27, 1979 [FR] France ................... 79 31836

[51] Int. Cl.³ ............................ B60V 1/00; B60V 3/02
[52] U.S. Cl. ........................................ 180/119; 180/21
[58] Field of Search ................. 180/119, 116, 164, 22, 180/21

[56] References Cited

U.S. PATENT DOCUMENTS 3,246,712  4/1966  Mackie ............................. 180/119
3,276,528 10/1966  Tucknott et al. .................. 180/119
3,774,716 11/1973  Vaughen ........................... 180/119
4,190,129  2/1980  Mary ................................ 180/119

Primary Examiner—John A. Pekar
Attorney, Agent, or Firm—Pollock, Vande Sande & Priddy

[57] ABSTRACT

The invention relates to a vehicle provided with a per se known supporting system (2) on a support (3) of its path and provided with at least one auxiliary wheel (1). The wheel (1) is joined to the frame (2) of the vehicle by means of a support (22a) for its axis of rotation and of a hinged linkage system (23, 24) of said support to the frame enabling the constant maintaining of the wheel in contact with a supporting surface (3) with known friction which is parallel with the path A of the vehicle and from which the frame (2) is held at a distance D which remains substantially fixed by a high resilient rigidity arrangement (12), said connections system being such that when the wheel is subjected to a force F contained in said supporting surface and being exerted at the point of contact C of the wheel (1) with the surface (6) said force produces a reaction force Q of the high resilient rigidity arrangement proportional to F tending to apply the wheel (1) against the surface (3). The invention is particularly applicable to vehicles of air cushion type. See FIG. 7.

9 Claims, 37 Drawing Figures

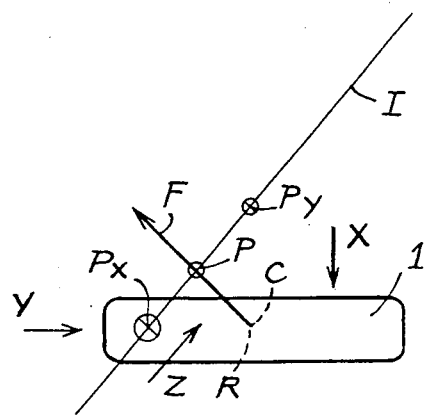
Fig_1A
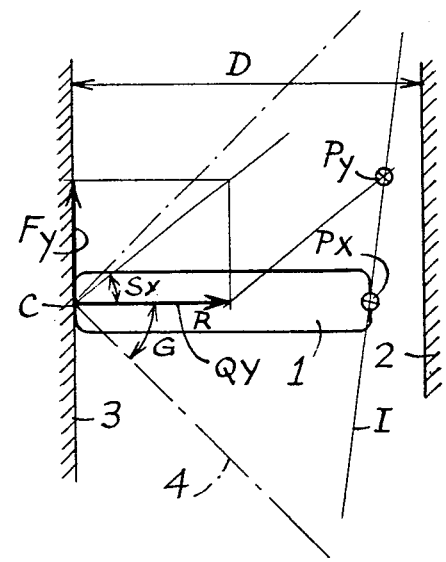
Fig_1C
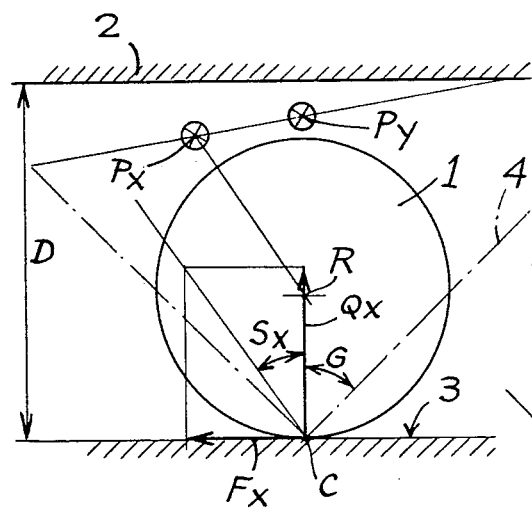
Fig_1B
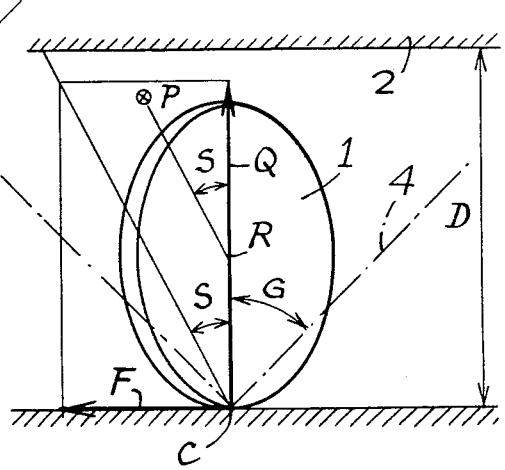
Fig_1D

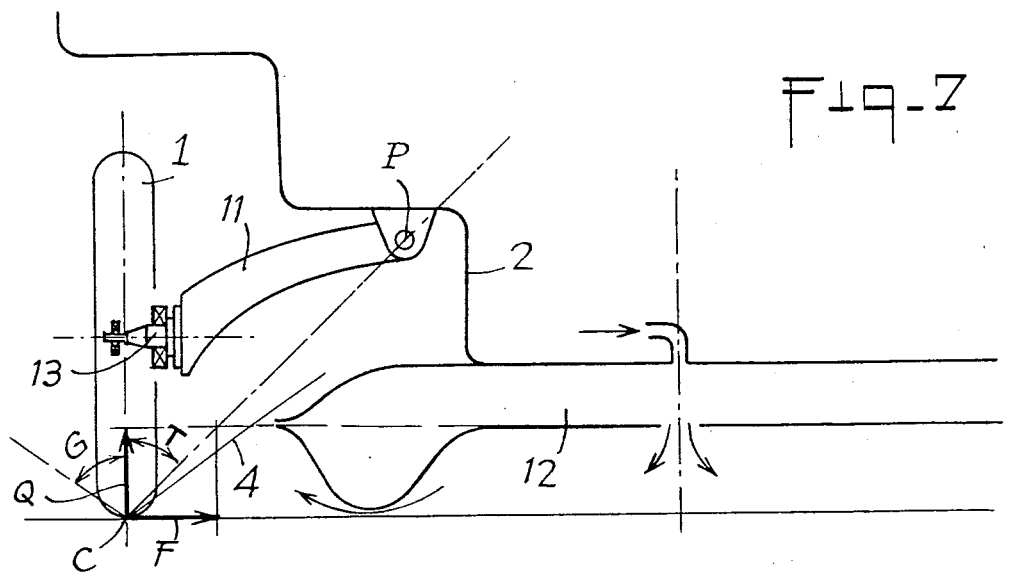
Fig_7
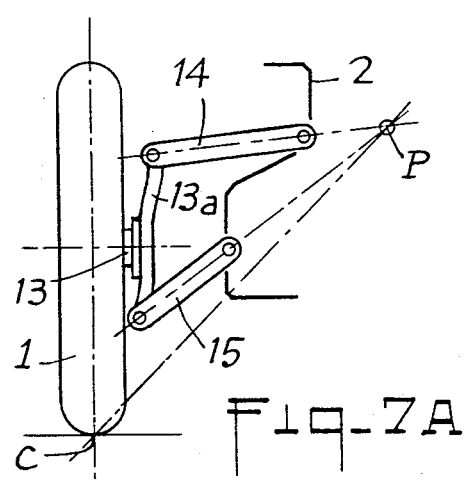
Fig_7A
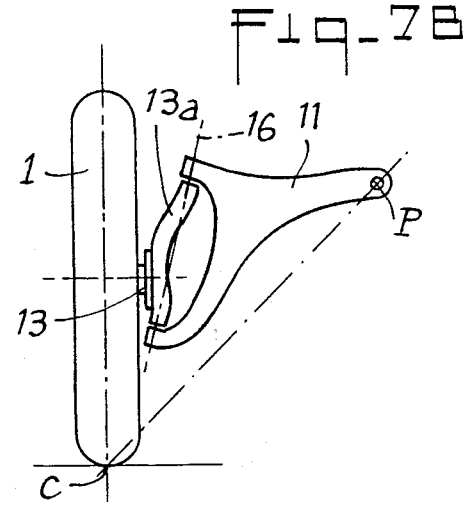
Fig_7B
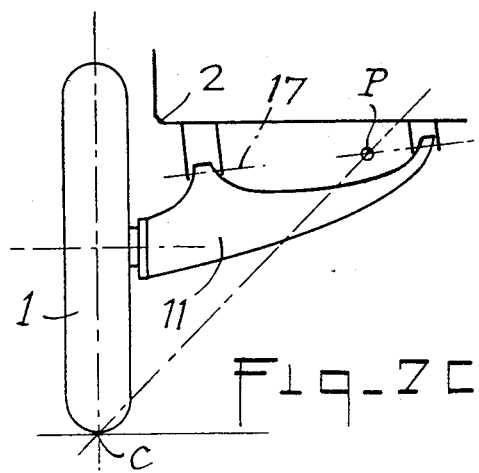
Fig_7C
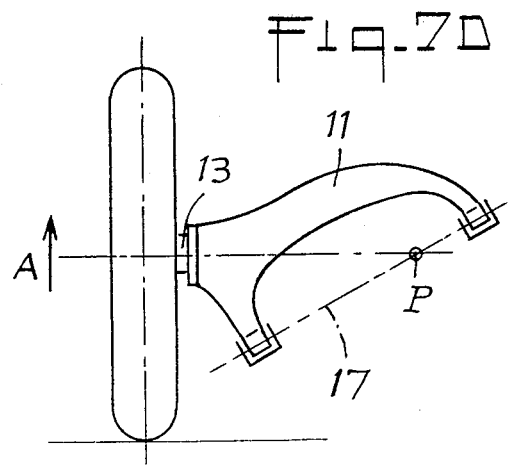
Fig_7D

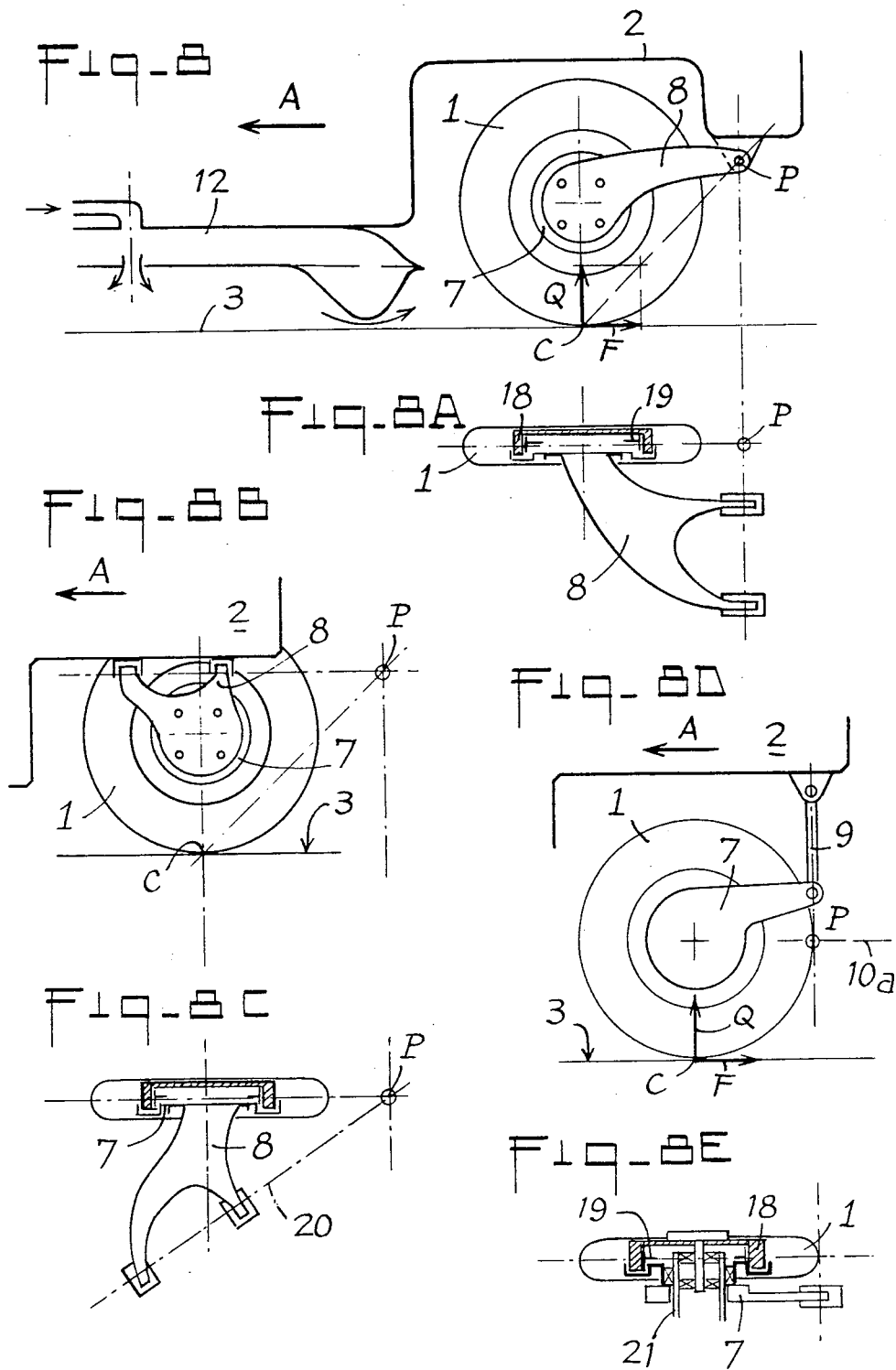

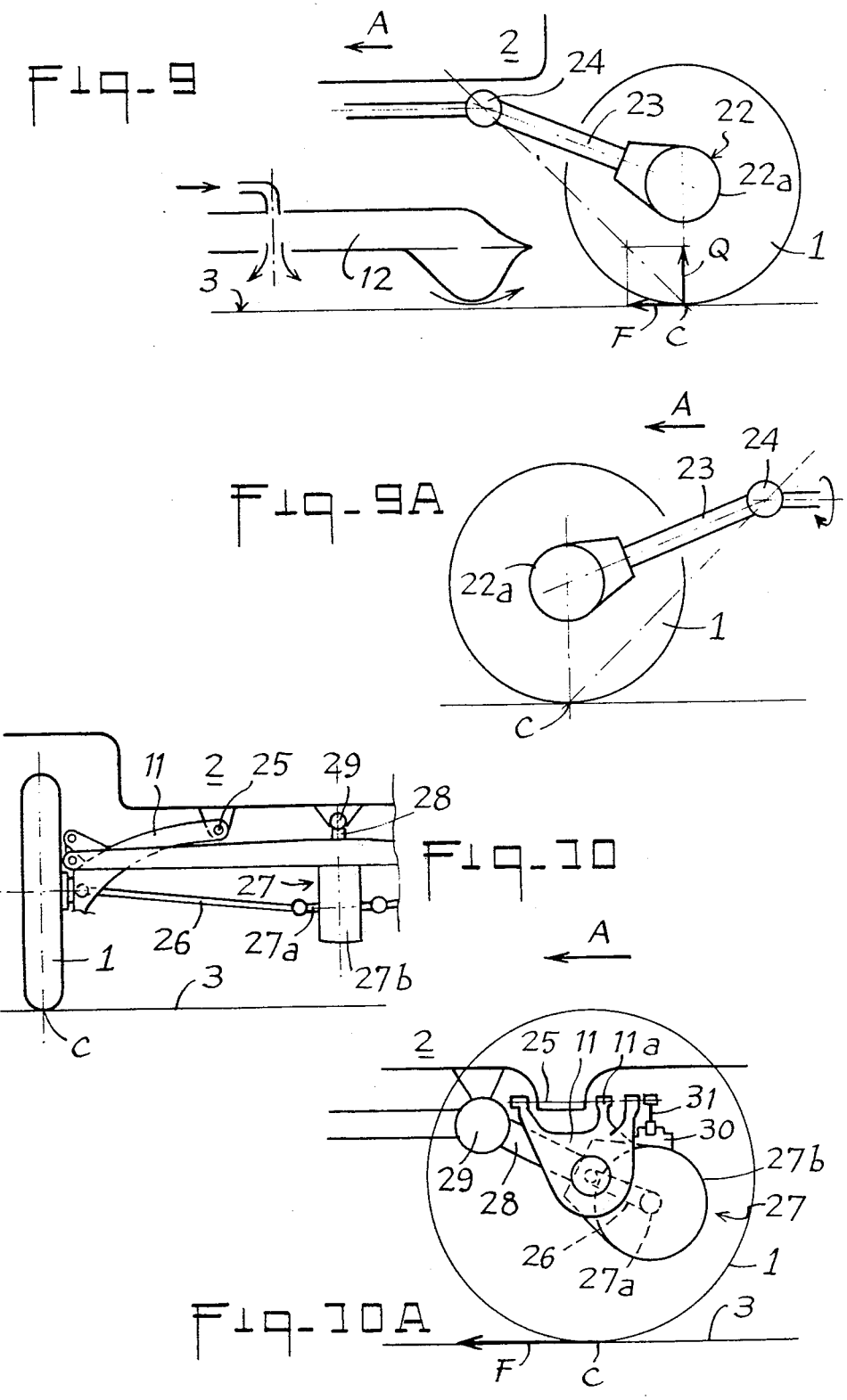

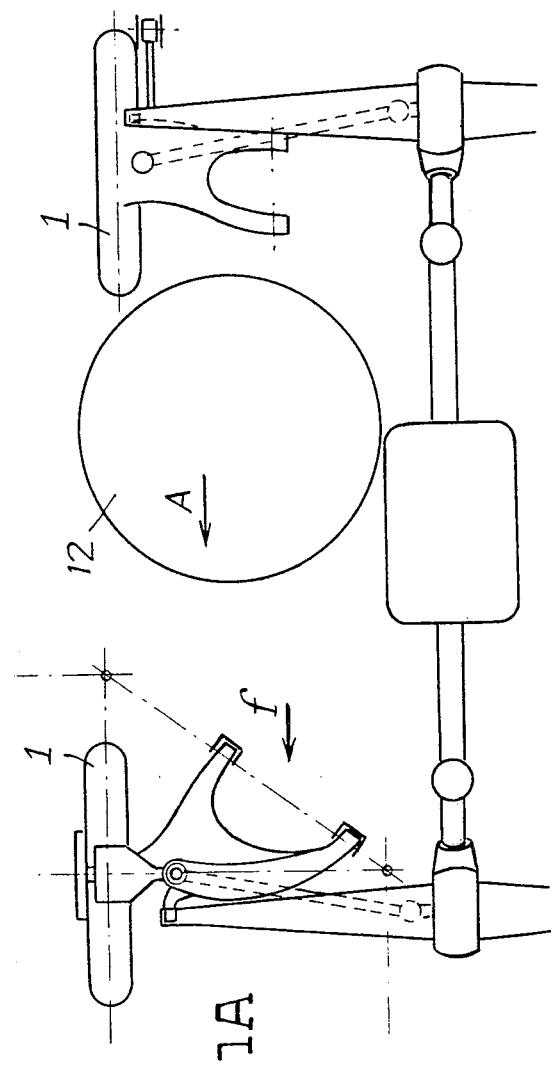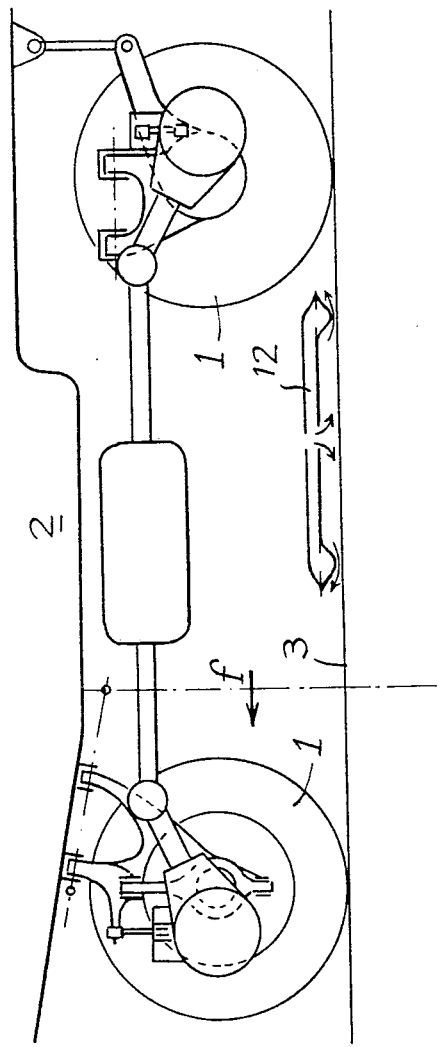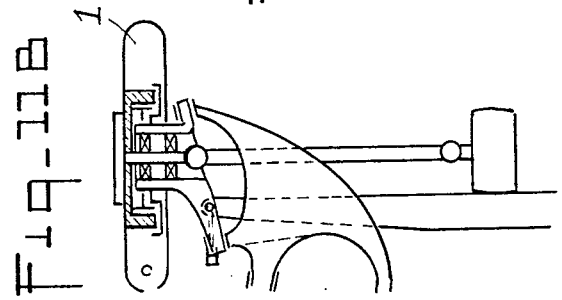

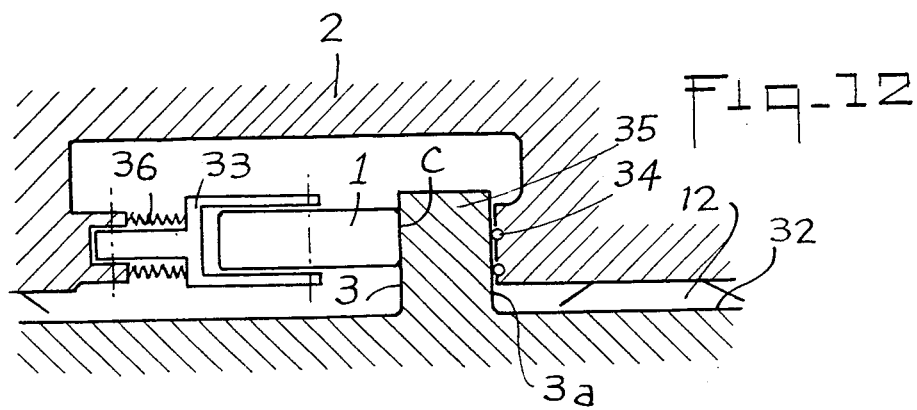
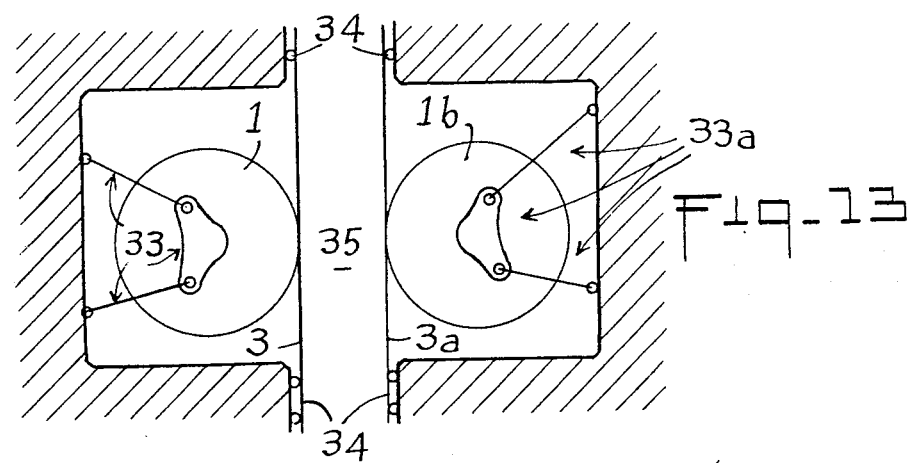
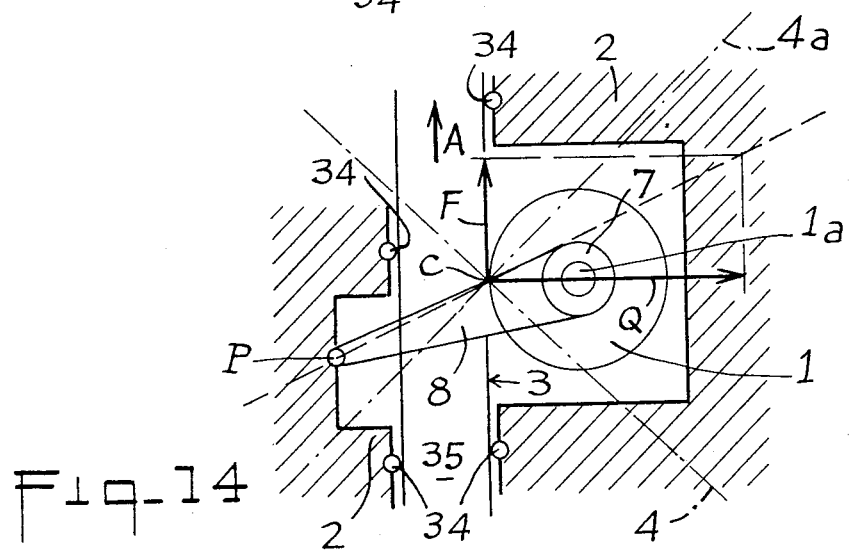

VEHICLE FITTED WITH AN AUXILIARY WHEEL FOR PROPELLING, GUIDING AND OR BRAKING THE VEHICLE

SUMMARY OF THE INVENTION

The invention relates to a land vehicle, that is to say a mobile body, self-propelled or drawn relative to a fixed supporting surface. It comprises therefore a system ensuring its support relative to said surface, the main purpose of which is to reduce friction between the mobile body and the support. It also comprises means for propelling, guiding, and/or breaking the vehicle. In standard vehicles the supporting system is a wheel as-sembly and the means for propelling and braking are provided to comprise at least part of said wheels, while guiding may be effected by separate means.

In other vehicles the supporting system is called a "ground effect" supporting system (air of fluid cushion), the motion generating means being constituted by separate members of the supporting system (propellers or propulsion units operating on a jet system, attraction, etc.), guiding being possibly effected by said generating means of the orientable type, or by means of a stationary installation parallel with the desired path of the vehicle.

The invention relates to means at least for propelling and/or guiding for vehicles with any known supporting arrangement, and can be applied in a particularly advantageous manner to ground effect vehicles. It relates also to means for guiding such vehicles if the latter is not effected in an otherwise known manner. These means call into play at least one single or multiple wheel independent of the supporting device. More precisely, the invention has for its object a vehicle fitted with any known supporting system on a support of its path and provided with at least one auxiliary wheel.

According to one of the features of the invention, the auxiliary wheel is connected with the frame of the vehicle by means of a support for its axis of rotation and an articulated system of connections of the support to the frame, enabling the wheel to be held constantly in contact with a supporting surface, with known friction. The auxiliary wheel is parallel with the path of the vehicle, and the frame of the vehicle is held at a substantially fixed distance by a device of high resilient rigidity. The articulated connection system is such that, when the wheel is subjected to a force exerted at the point of contact of the wheel with the supporting surface, the force generates in the connection system other forces tending to move the frame away from the supporting surface. The resultant of the other forces is contained in a "cone of friction" to which the device of high resilient rigidity opposes itself through reaction forces one of the components of which, transmitted by the connection system, tends, through the support, to apply the wheel against the supporting surface at a degree of intensity proportional to the force.

In a first embodiment of the invention the support is, a known type, such that, along the plane perpendicular to above-mentioned supporting surface containing the point of contact of the wheel with the supporting surface and passing through the force, the wheel-support connection is of the free articulation type, at the level of which connection the stress produces no torque on the support the moment of which is not contained in the plane. The trace in this plane of the instantaneous axis of rotation, real or virtual, of the support relative to the frame is defined by said articulated connections system and is situated in the zone defined by the trace of the cone of friction which, on the wheel side, is inclined towards the force and by the perpendicular to the supporting surface at the said point of contact, the inclination on the supporting surface of the straight line passing through the trace of the wheel axis, and said trace of the instantaneous rotation axis defining the said coefficient of proportionality between the intensity of the force and the component of the other forces tending to apply the wheel on said surface.

In a second embodiment of the invention, the support is, in a manner, such that in the plane perpendicular to said supporting surface, containing the point of contact of the wheel with the surface and passing through the force, the wheel-support connection is of a type at least partly rigid, at the level of which the force produces a torque on the support the moment of which is not contained in said plane. The trace in the plane of the instantaneous axis of rotation, real or virtual, of the support relative to the frame, is defined by said system of articulated connections, and is situated in the zone defined by the trace of the cone of adherence which, on the wheel side, is inclined towards the force and by the perpendicular to the supporting surface at said point of contact, the inclination on the supporting surface of the straight line passing through the point of contact of the wheel with the supporting surface and said trace of the instantaneous axis of rotation defining the coefficient of proportionality mentioned above between the force to which the wheel is subjected and the component of the other forces tending to apply the wheel on said surface.

When the wheel, according to the first embodiment above-mentioned, is intended for the propulsion or the braking of the vehicle, the force is generated through the application of a torque to the axis of the wheel by means of a known arrangement, the reaction torque of which is balanced by the frame, the plane being then substantially parallel with the path of the vehicle.

For a wheel also intended for the propulsion or for the braking of the vehicle, according to the second embodiment, the force is generated by the application of a torque to the axis of the wheel by means of a known arrangement the reaction torque of which is coaxial with the torque and is balanced by the support, the arrangement then effecting between the wheel and the support the above-mentioned at least partly rigid connection, said plane being then substantially parallel with the path of the vehicle.

For a wheel intended for the guiding of the vehicle in the first embodiment, the force is then substantially parallel with the axis of the wheel, said axis being hinged in said support about an axis perpendicular to said plane which is then a plane substantially transversal to the path of the vehicle.

Finally, for a wheel intended for the guiding of the vehicle in the second embodiment, the force is then substantially parallel with the axis of the wheel, the axis being embedded in the support as regards its movements about an axis perpendicular to the plane which is then a plane transversal to the path of the vehicle.

Moreover, the above-mentioned articulated connections system is constituted in a first alternative embodiment by the actual support directly hinged to the frame, the articulation axis constituting the instantaneous axis of rotation of the support.

In a second alternative embodiment, the hinged connections arrangement is constituted by two convergent levers, hinged respectively between the frame and the support, their point of intersection defining the instantaneous axis of rotation of the support.

In a particularly interesting application of the invention, the vehicle is such that the support of its path and the supporting surface above-mentioned are constituted by the ground or the like, and the arrangement with high resilient rigidity is constituted by a ground effect supporting means, said wheel resting on the ground as a result of its own weight.

For this application, the second embodiment of the invention may consist in that, said wheel being carried at the end of a rigid axle and being a driving wheel through counter-gearing, said support is constituted by a counter-gearing itself comprising, in known manner, a thrust tube hinged on the frame about a shaft placed forward of the transversal line passing through the point of contact of the wheel with the ground relative to the direction of forward movement of the vehicle.

For this application also, an alternative embodiment of the invention consists in that said wheel being coupled in independent manner with the said frame by means of a known support, permitting a vertical clearance of the wheel relative to the frame, and being a driving wheel through counter-gearing and a shaft of hinged joints type, the above-mentioned articulated connections system is constituted by the countergearing itself, hinged in known manner on the frame of the vehicle about a shaft situated forward of its output shaft connected with the articulated joint shaft, relative to the forward direction of movement of the vehicle and by a member solid with said countergearing and connected with the vertical movements of the support.

In another application of the invention, the vehicle is such that the support of its path is constituted by a track and said supporting surface is parallel with the path, the arrangement with high resilient rigidity being constituted by the frame of the vehicle itself guided relative to said supporting surface, said wheel being returned with little force against said supporting surface.

The invention will be better understood on following the description given hereinunder for the sake of purely indicative and non-limitative example which will make it possible to bring out the advantages and secondary features.

BRIEF DESCRIPTION OF THE DRAWINGS

Reference will be made to the attached drawings in which:

FIGS. 1A to 1D are diagrams illustrating the principle of a first embodiment of the invention;

FIGS. 7 to 7D show a first application of the second said embodiment, in various alternatives, to a ground effect vehicle;

FIGS. 8 to 8E illustrate a second application of said second embodiment, particularly in its versions of FIGS. 4B and 6B;

FIGS. 9 and 9A illustrate an application of the version of FIG. 4A to a ground effect vehicle;

FIGS. 10 and 10A show a third embodiment of the invention in its application to a ground effect vehicle;

FIGS. 11, 11A and 11B illustrate a possible combination of the various versions of the embodiments of the invention utilised on the front and rear sets of wheels of a ground effect vehicle;

FIG. 12 illustrates diagrammatically an application of the invention to an arrangement supported and guided on a track;

FIG. 13 represents diagrammatically an application of the invention in conformity with FIG. 12 with paired wheels;

FIG. 14 illustrates through an alternative of FIG. 4A applied to an arrangement according to FIG. 12 a possible generalization of the invention.

BEST MODE FOR CARRYING OUT THE INVENTION

Figure 2A:
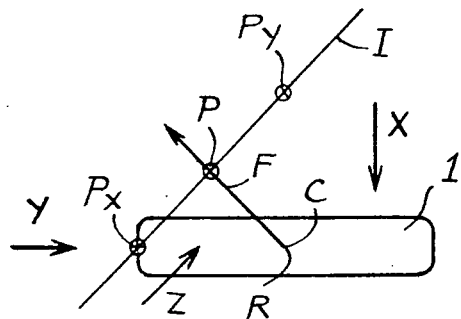
FIGS. 2A to 2D are diagrams illustrating the principle of a second embodiment of the invention.

Referring first of all to FIGS. 1A to 1D, a wheel 1 is seen coupled to the frame 2 of a vehicle by means of a an unillustrated coupling arrangement which comprises a support for the rotary spindle of the wheel and a system of hinged connections of support to the frame. This support can move in a direction defined hereinunder. The support and the system of hinged connections have not been represented for, as will be seen hereinbelow, several constructions of this are possible.

Frame 2 of the vehicle is arranged to move on a surface which forms a support of its path which may be the ground, a prefabricated track, etc. For this purpose, the frame comprises supporting members resting on the surface so as to minimize friction between it and the frame. This path support as well as the supporting members are not illustrated on FIGS. 1A to 1D.

The vehicle, moreover, moves parallel with a surface 3 from which frame 2 is kept at substantially constant distance D by means of a high resilient rigidity arrangement which has not been illustrated as it is such as to be constructed in various forms.

Surface 3 constitutes a supporting surface for the wheel 1 which is constantly held in contact with surface 3. The point of contact of wheel 1 on surface 3 will be denoted as C. The friction of wheel 1 on surface 3 is dependent upon the surface condition of each of them and is defined in a standard manner by a "cone of friction" the trace 4 of which has been represented in the plane of FIGS. 1B, 1C and 1D. Trace 4 has a half angle G whose tangent is equal to the coefficient of friction.

The wheel support is, in the case of FIGS. 1A to 1D, such that the shaft it carries is mounted thereon in the manner of a ball-and-socket joint. In other words, this means that if a force F (FIG. 1A which is a projection of the wheel onto the surface 3) contained in the surface 3 is applied to the wheel 1, the latter generates no torque in its support. Naturally, other means are provided (for xample, axle paired wheel) for the above-mentioned wheel to retain its position relative to surface 3. For reasons of clarity of the description these means have not been illustrated. It will be seen in the part of the following description relating to certain simplified embodiments how a support may meet this condition. In addition, the above-mentioned hinged connection system is such that the support subjected to a force F has a real or virtual instantaneous axis of rotation (shown as I on the figures). Examples of this axis will also be given hereinbelow.

In the case of FIGS. 1A–1D, with a support being subjected to no torque on the part of the wheel subjected to the force F, the hinged connection system must be such that its instantaneous axis of rotation I passes through the plane perpendicular to the surface 3 containing the force F (the plane of FIG. 1D which is a view along Z of FIG. 1A) at a point P (the trace of I in said plane) situated above the surface 3 to one side of the wheel and beyond point C in the direction of force F. A straight line passing through P and through trace R of the wheel spindle in this plane is the direction of the resultant of the forces transmitted by the wheel, the support and the system of hinged connections to frame 2 under the action of force F. See FIG. 1D. As frame 2 is held at a distance D, substantially fixed, from surface 3 by an arrangement having high elastic rigidity and being therefore practically indeformable, it balances this resultant. The analysis of the balance shows that the resultant has a component F in surface 3 and, perpendicular to said surface at point C, a component Q. This force Q is proportional to force F and tends therefore to apply wheel 1 on surface 3 at an intensity proportional to force F, the proportionality coefficient being defined by the angle S between line PR and the vertical to the surface 3 passing through C. This resolution of force is achieved only if S is smaller than above-mentioned angle G.

FIG. 1B is a view along X of FIG. 1A (projection on the plane of wheel 1) and FIG. 1C is a view along Y of FIG. 1A (projection on a plane perpendicular to the plane of the wheel). The axis of rotation I is referenced Px in the plane of FIG. 1B and Py in the plane of FIG. 1C. That which was shown regarding force F in the plane containing it (FIG. 1D) is applicable to its components Fx and Fy which will give rise to vertical components Qx and Qy the total of which is incidentally equal to Q.

Figure 2C:
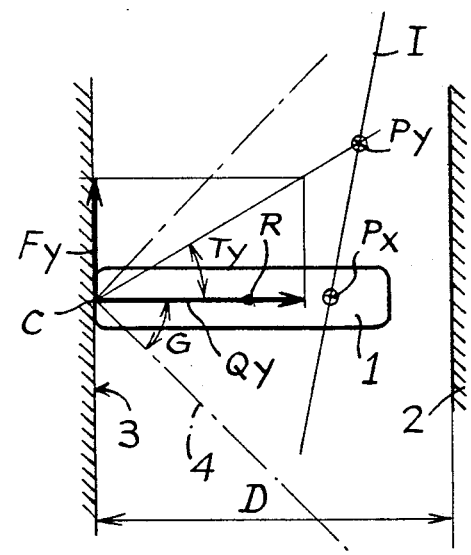
Figure 2B:
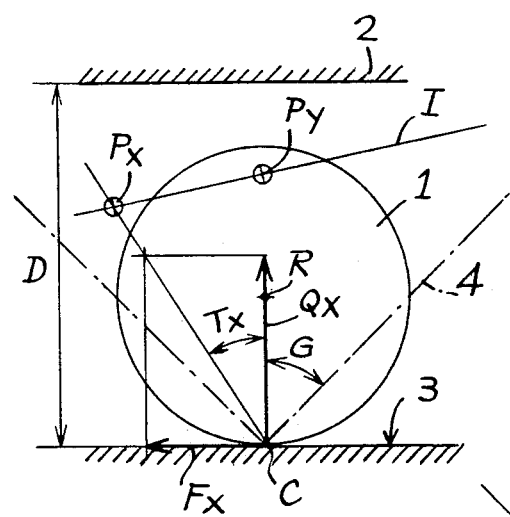
Figure 2D:
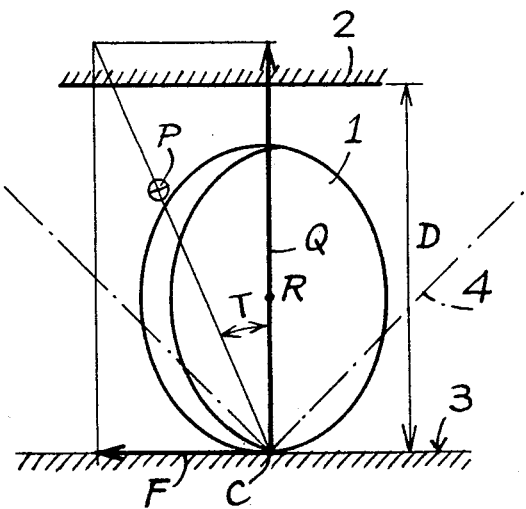

In FIGS. 2A to 2D a representation has been given in diagrams identical with the foregoing of a second embodiment in which the support of the wheel spindle, all other things being equal, comprises an at least partly rigid connection with said wheel, whether it is by outright embedding or by a connection with motor or friction torque transmission, so that force F induces a torque on the support through the wheel spindle. Under such a condition is is observed that the resultant of the forces transmitted by the wheel, the support and the articulated connection system on frame 2 is established along a line passing through point C and the trace P of the axis of instantaneous axis of rotation I of the support relative to the frame in the plane containing the force F and perpendicular to the surface 3 (FIG. 2D). Along this line there is also established the force of reaction of the frame 2 on said members as a consequence of the above-mentioned arrangement for holding the frame away from surface 3 at above-mentioned distance D.

The analysis of this balance shows that force F therefore generates a force Q perpendicular to surface 3 tending to apply wheel 1 onto the surface, insofar as above-mentioned trace P is situated beyond above-mentioned point C in the direction of force F and the angle T formed by line PC with the vertical at point C of surface 3 is smaller than angle G. It will be noted in this connection that the value of this angle T defines the coefficient of proportionality between F and Q.

That which has just been shown with regard to FIG. 2D for the force F applies to the figures 2B and 2C relating to the component Fx of F in the plane of the wheel, or at least in the plane perpendicular to surface 3 and parallel with the path of the vehicle (the plane of the wheel being able to present a set or rake angle relative to said plane) and the component Fy and F in the plane perpendicular to surface 3 and to the path of the vehicle, the intersection of these planes passing through point C. It will be noted that the sum of Qx and Qy is equal to Q.

These two sets of diagrams present the general means of the invention for two embodiments thereof which, in functional terms, cause the frame 2 to resist any force tending to move the frame 2 from surface 3, thus producing a reaction tending to apply the wheel onto the surface, proportional to the force applied to the wheel at its point of contact with the supporting surface.

The forces F may be of three principal types. They are either propulsion forces, or forces braking the vehicle which are therefore parallel with the path of the vehicle, or finally guiding forces which are perpendicular to said path. Generally speaking, any force F comprises therefore an acceleration or braking component, and a guiding component.

Figures 3A, 3B:
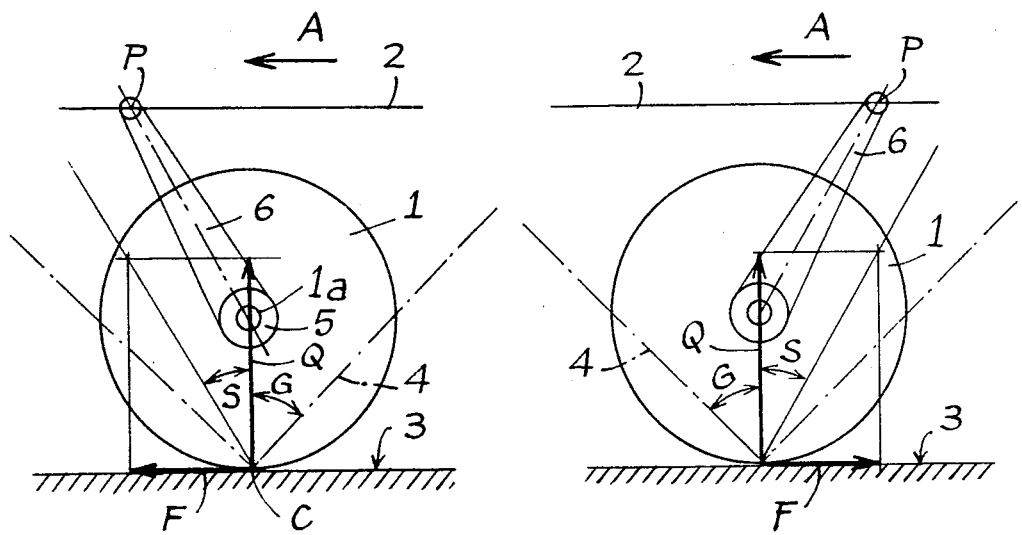
FIGS. 3A and 3B illustrate a first simplified version of the above-mentioned first embodiment.

FIG. 3A relates to a first simplified version of the first embodiment of the invention in which wheel 1 is a propelling wheel, i.e. a wheel subjected to a force F parallel with its path. There will be noted on this figure, as on the following figures, that the path of the vehicle and its direction are shown by arrow A. The support of spindle 1a of the wheel such as referred to hereinabove is constituted here by a bearing 5 with an axis perpendicular to the plane of the figure while the above-mentioned arrangement of hinged connections of the support to the frame 2 is constituted by an arm 6 which is fixed to bearing 5. Arm 6 is articulated about an axis the trace of which in the plane of the figure (containing the force F) is situated at P. This axis may be orientated as desired or, in a simplified version, it may be perpendicular with the path of the vehicle. In the case of the figure, the force F originates from a torque applied to the spindle 1a by means of a known device (flexible or articulated linkage shaft) the reaction torque of which is absorbed by frame 2. It is therefore clearly seen that there is no torque exerted on bearing 5 as a reaction to force F. FIG. 3A is therefore to be considered alongside FIG. 1B as regards the study of the balance of the forces and the position of trace P must obey the same forces as trace Px of FIG. 1B, to obtain the anticipated result. Thus, it is seen that the more the torque applied to the wheel is substantial, the more F is substantial, and therefore the more the wheel is strongly applied on surface 3, therefore the more the vehicle "grips" onto said surface.

FIG. 3B illustrates a version similar to that of FIG. 3A in which the force F generated is a braking force (parallel with an opposed to path A of the vehicle). This braking effort is the result of the application of a braking torque to spindle 1a of the wheel by means of an arrangement the reaction torque of which is absorbed by the frame (brakes situated for example at the output of the gearbox). There is therefore no torque generated by the force F applied to bearing 5. This version belongs therefore to the field of the first embodiment explained on the basis of FIGS. 1A to 1D.

Figures 4A, 4B:
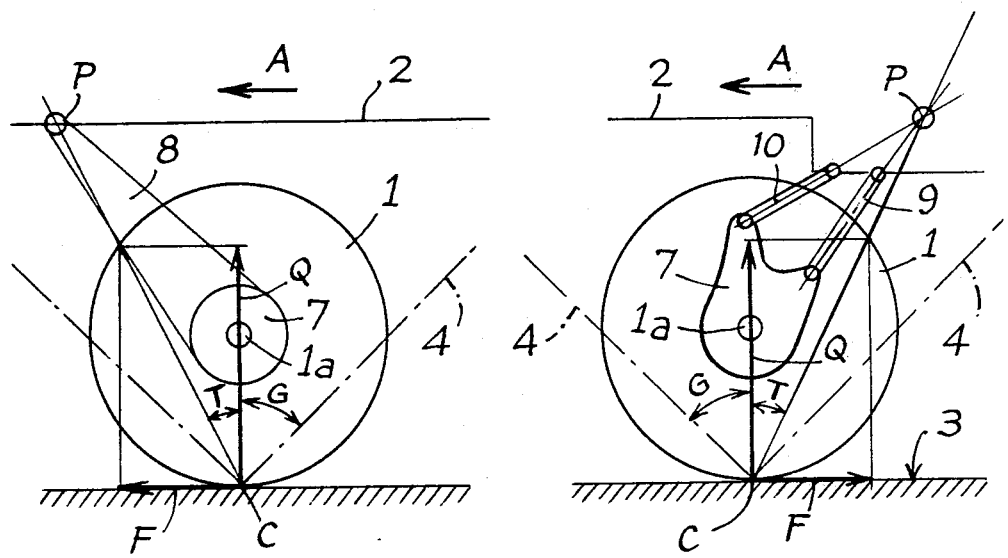
FIGS. 4A and 4B illustrate respectively through two alternatives one and the same simplified version of the second embodiment.

FIG. 4A relates to a first simplified version of the second embodiment of the invention in which wheel 1 is a driving wheel propelling the vehicle in direction A. The support of the wheel spindle 1a is constituted by a bearing 7 while the articulated linkage system is a lever or arm 8 fixed to bearing 7 and hinged to the frame 2 about an axis of trace P in the plane of the figure. The propulsion force F is generated by a torque applied to the spindle 1a of the wheel by means of a (hydraulic, electric, etc.) motor arrangement, the stator of which is solid with the bearing 7 and is coaxial with it. Thus, the reaction torque is balanced by the bearing 7 and the arm 8. It is therefore seen that the production of a force F generates a torque on the bearing 7. As a result FIG. 4A is to be considered in terms of FIG. 2B as regards the study of the balance of forces. The above-mentioned trace P must therefore assume a position such as that set out on the basis of FIG. 2B for it to be possible to obtain the desired result, i.e. be situated forward of the point of contact C relative to the direction of propulsion A of the vehicle and be contained inside the cone of adherence 4.

On FIG. 4B relates to a constructional version of the second embodiment of the invention applied to the braking of the vehicle, the force F of direction opposite that of arrow A is generated by a braking device the members of which not connected with the wheel 1 are solid with the support or bearing 7 which therefore absorbs the reaction torque. It should be noted that the system of articulated linkage of the said support to the frame 2 is constituted by two levers or rods 9 and 10 hinged on the support 7 and on frame 2; they are convergent and their intersection defines, in known manner, the instantaneous axis of rotation of the support 7 relative to frame 2. The trace P of this instantaneous axis of rotation in the figure plane containing the force F must meet the position conditions set out with reference to FIGS. 2A to 2D. That is to say, for this case, trace P must be situated at the rear of point C relative to the direction of forward movement of the vehicle and contained in the cone of friction.

Figure 5A:
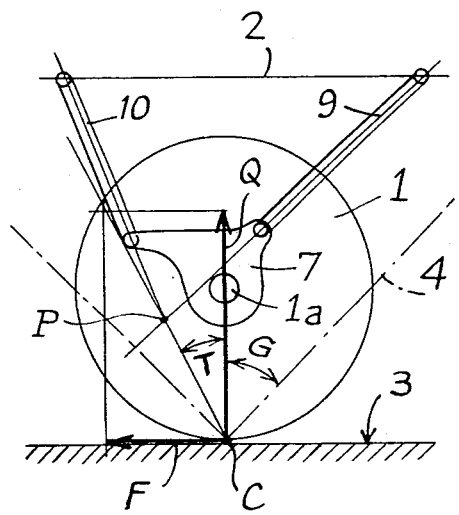
FIGS. 5A and 5B represent a second simplified version of the embodiment of FIGS. 2A to 2D.
Figure 5B:
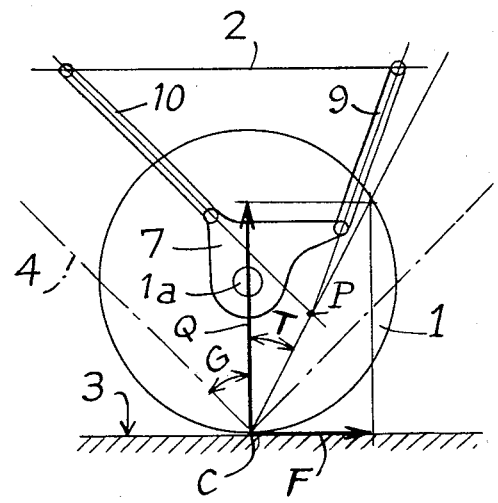

FIGS. 5A and 5B are to be related respectively to FIGS. 4A and 4B. It will be seen that the bearing 7, which is fitted as in the foregoing figures either with the stator of the driving member, or with the braking elements not connected to the wheel, is joined to the frame 2 by two mutually articulated and convergent rods 9 and 10. Their intersection defines in known manner the instantaneous axis of rotation the trace P of which in the figure plane must meet the conditions set out with reference to FIGS. 2A to 2D. The analysis of the balance of the forces applied to the wheel 1 shows the above-mentioned vertical component Q. Naturally, as in the case of FIGS. 4A and 4B, P is situated forward of point C for a propelling wheel and behind said point for a braking wheel.

Figure 6A:
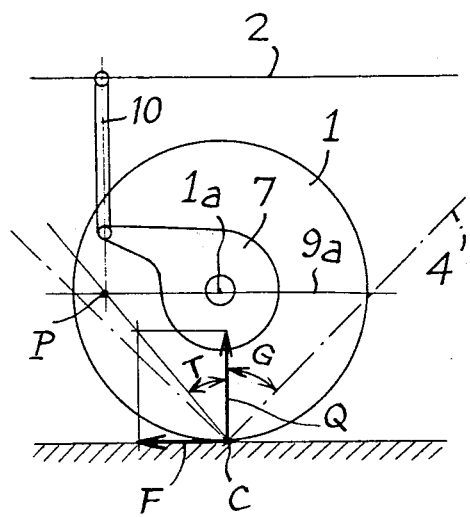
FIGS. 6A and 6B represent a third simplified version of this same embodiment.
Figure 6B:
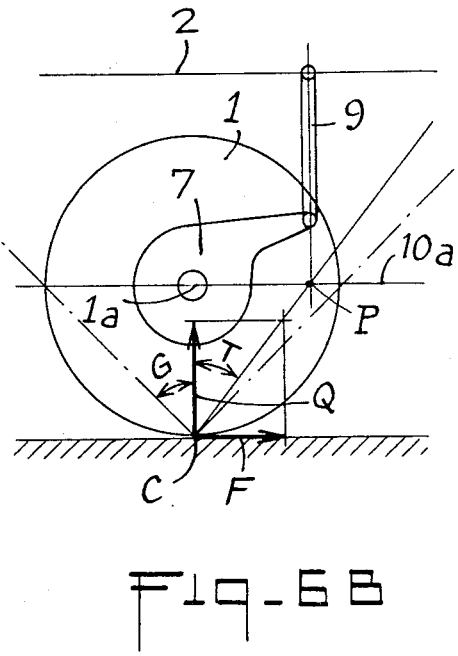

FIGS. 6A and 6B are a particular case of FIGS. 5A and 5B. For FIG. 6A the coupling point of rod 9 to frame 2 is pushed back to infinity, that is to say that bearing 7 is held by an arm transversal to the path of the vehicle hinged about a longitudinal shaft on the chassis, bearing 7 being always hinged on this arm, not represented, about an axis perpendicular to the figure plane, rod 10 being then substantially vertical. Point P is then defined as the intersection of the projection of the rod 10 in the figure plane with line 9a parallel with the surface 3 passing through the axis of the articulation of the bearing support 7 with said arm transversal to the path of the vehicle (here merging with the spindle 1a of the wheel). In the case of FIG. 6B, it is the articulation of rod 10 on the frame which is pushed back to infinity. Support 7 is therefore articulated about spindle 1a (which may be a spindle parallel with the latter and not merging) on a transversal arm longitudinally articulated on the frame 2 (or any arrangement permitting movement perpendicular to surface 3 and parallel with the path of bearing 7).

Such an arm transverse to the path of the vehicle is illustrated at 11 by FIG. 7. This figure is a transversal diagrammatic view of a vehicle fitted with a wheel according to the invention. This vehicle is of ground effect type, that is to say its support is ensured by one or more arrangements 12 producing an air or fluid cushion between the frame 2 and the supporting surface of its path (here: the ground) which in this case merges with the support surface 3 of wheel 1.

It should be noted that the vehicle may comprise elastic suspension arrangements. In this case frame 2 will be a false chassis rigidly connected to the support elements, suspension being effected between said false chassis and the remainder of the structure of the vehicle.

The arrangement with high elastic rigidity which holds the vehicle frame at a fixed distance from the ground is the actual air cushion. It is indeed known that an air cushion is elastically very rigid. As a result of this characteristic, any means tending to raise the vehicle frame relative to its normal support position is burdened with a very substantial fraction of the weight of the vehicle for a few millimeters of elevation. The invention uses therefore this weight support phenomenon to ensure the various functions of the auxiliary wheel which it brings about. Maintaining permanent contact of the auxiliary wheel on the ground is achieved by the actual weight of the wheel, which may be aided by an auxiliary spring, the members of its coupling to the frame allowing it to rest on the ground through its own weight.

In this application FIG. 7 is to be related to FIG. 20. Indeed, the spindle of wheel 1 is held in a bearing (or on a spindle 13) constituting said support, said spindle 13 being embedded in an arm 11 (forming said articulated connections system (as regards its movements about an axis perpendicular to the figure plane relative to the arm, and therefore held rigidly by said arm which is itself hinged on the frame about a shaft passing through the figure plane at a point P. When wheel 1 is subjected to a force F at its point of contact C with the ground, directed transversally towards the inside of the vehicle, a vertical force Q is produced tending to apply the wheel against the ground, proportional to F if point P is in a position meeting the conditions defining the position of point Py of FIG. 2C, i.e. if it is situated beyond point C in the direction of force F, and therefore inside the vehicle, and if the straight line CP is contained in the cone of friction 4, that is to say if the angle T of the straight line CP with the vertical passing through C is smaller than angle G (the angle T defining the coefficient of proportionality between F and Q).

It will be seen that a wheel 1 mounted on an air cushion vehicle as in FIG. 7 is a guiding wheel of said vehicle, the force F being possibly the result of a component of the weight of the vehicle on sloping ground, of wind acting on the vehicle, or of the centrifugal force acting on the vehicle as it turns. The more substantial the force F, the more substantial is Q also, and therefore the more wheel 1 is loaded and grips the ground. On the other hand, if F is nil, so is Q and the wheel resting with its own weight on the ground dissipates no energy at the level of its rolling.

FIG. 7A is a diagram in which the arm 11 is replaced by two rods 14 and 15 hinged on an extension 13a of the shaft 13 and on the frame 2, and convergent. Their intersection defines a virtual instantaneous axis of rotation the trace P of which in the figure plane corresponds to point P of FIG. 7. This shaft is not a fixed one as in the previous figure and its movement may be such that it brings about an increase of the above-mentioned coefficient of proportionality.

FIG. 7B shows an alternative embodiment of FIG. 7 in which the arm 11 is coupled to shaft 13 by an extension 13a of the latter which is embedded in the arm about a shaft perpendicular to the figure plane, but which is hinged on the arm 11 about a pivoting axis 16. Wheel 1 can thus be made a guiding one.

FIG. 7C and FIG. 7D which is a top view of the foregoing show that the hinging axis 17 of the arm 11 is not longitudinal, but may relatively be of any design. P denotes the trace of this axis in the vertical plane passing through point C.

FIG. 8 illustrates an application to a vehicle with air cushion in the construction version of the second embodiment of the invention according to FIG. 4B in which the two rods are replaced by an arm (such as 8 FIG. 4A). On this figure the same references as on FIG. 4B are found again. The wheel is a wheel fitted with a braking device comprising members 18 connected to the wheel and members 19 connected to the support 7, which may be seen on FIG. 8A which is a diagrammatic top view partly sectioned at the spindle of the wheel of FIG. 8. FIGS. 8B and 8C (top view of FIG. 8B) show that the hinging shaft 20 of the arm 8 on frame 2 may be slanted, point B being its trace in the plane of FIG. 8D containing the force F.

FIG. 8D illustrates an application of FIG. 6B to a vehicle with air cushion. The same items with the same references are to be found in it. On FIG. 8E (which is a diagrammatic view of FIG. 8D) it will be seen that the wheel is held by the end of a transversal spindle on which support 7 is hinged; said support carries braking members 19 not connected to the wheel.

FIG. 9 illustrates an application to a vehicle with air cushion in the arrangement of FIG. 4A. It will be noted that wheel 1 belongs to a rigid axle which effects a drive by means of a type of transmission axle 22. This angle has a thrust tube 23 to be associated with the lever 8 of FIG. 4A hinged at 24 on the frame 2—hinge 24 constituting said point P. The casing 22a of the axle or transmission countergearing absorbs the motor countertorque and constitutes the support 7 of FIG. 4A for the spindle of wheel 1.

FIG. 9A is a diagram illustrating an assembly similar to that of FIG. 9 for propulsion towards the rear of the vehicle in a direction opposite that of arrow A.

On FIGS. 10 and 10A a third embodiment of the invention has been illustrated applied to a vehicle with air cushion for a driving wheel. Some of the items already described are found again with the same references. Wheel 1 is suspended from frame 2 by a transversal arm 11 hinged at 25 on the frame. A shaft 26 with hinged joints makes the wheel a driving one by connection with the output shaft 27a of a transmission countergearing 27 the casing 27b of which, which absorbs the motor countertorque, is solid with a hinged lever 28 articulated at 29 about a transversal shaft on the frame (or a hinging device of the ball-and-socket type permitting a rotation of assembly 27, 28 about a longitudinal shaft also). A beam 30 is solid with casing 27b and is coupled by a rod 31 to an extension 11a of lever 11. This coupling will be effected as closely as possible to the median plane of the wheel.

It will be seen on these figures that a propulsion force F is generated by the torque transmitted to the wheel by the shaft 26. The reaction torque suffered by the casing 27 brings about a rotation of the assembly 27, 28 towards the ground, as articulation 29 is placed forward of the casing 27 relative to the direction of forward movement of the vehicle. This rotation is followed by the beam 30 which pulls the arm 11 towards the ground and thus applies the wheel to the ground further to a force which is proportional to the torque therefore transmitted to force F.

The coefficient of proportionality is dependent upon the radius of the wheel, the distance on a horizontal plane from the articulation 29 to the output 27a of the countergearing 27, and upon the distance separating the rod 31 from hinge 25 of lever 11.

It should be observed in connection with this embodiment that lever 11 may impart to wheel 1 a guiding function if the trace of shaft 25 in the vertical transversal plane passing through point C is at the proper place, and that this wheel may also be fitted with a braking device according, for example, to FIGS. 8B and 8C if shaft 25 is placed as is shaft 20 on these figures.

It is therefore possible to couple a wheel according to the invention to a vehicle with air cushion in a high number of possible combinations to impart to it one, two or the three functions of guiding, propulsion and braking of this vehicle.

FIGS. 11, 11A and 11B, respectively in elevation, plan and according to f, illustrate a possibility of these combinations for a two-axle vehicle. The items previously described will be found again on these figures with the same references. Thus, the front axle of this vehicle effects a guiding function according to the arrangements of FIGS. 7C, 7D. It is a driving one as in FIG. 7B. It is a braking one as in FIGS. 8B, 8C, and it is propelling towards the rear according to the arrangements of FIGS. 10 and 10A.

As for the rear axle, this is propelling, forward (arrangements of FIGS. 10 and 10A), able to effect a braking function (arrangements of FIGS. 8D, 8E) and a guiding function (arrangements of FIG. 7).

On FIG. 12 a representation has been given of a vehicle able to move on a support of its path (here a track 32). A system for holding this vehicle on this support is represented here by air cushions 12, but any other system may be suitable (hydraulic film, wheels, skids, etc.).

On it the wheel is found, connected with the frame 2 of the vehicle by a support to the hinged connection system 33 which enables the wheel to be constantly held in contact at C with a supporting surface 3 which is parallel with the path of the vehicle. The frame of the vehicle is guided relative to this fixed surface 3 by means of an arrangement with high resilient rigidity diagrammatically shown on FIG. 12 by rolling skids 34 solid with the frame and resting on the surface 3 and on a conjugated surface 3a, these surfaces being formed by the sides of a guiding rail 35. Thus, the frame of the vehicle is always held at a fixed distance from the supporting surface 3. Springs 36 coupled between the frame 2 and the wheel permit ensuring the permanent contact of the latter with surface 3. Their effect is of low intensity, comparable with the actual weight of the wheels in the preceding figures. The assembly 33 is of the type of those described with reference to the preceding figures relating to the functions of propulsion and braking, the guiding function being performed by rail 35.

In FIG. 13 a diagrammatic representation has been given at 1b, 33a of an assembly comprising a wheel, a support, a system of hinged connections conjugated with assembly 1, 33, cooperating with conjugated supporting surface 3a. This arrangement makes it possible to balance the stresses suffered by the frame of the vehicle.

FIG. 14, in which the items already described bear the same reference, shows diagrammatically that said trace P of the instantaneous axis of rotation of the frame may be situated under the supporting surface 3 and at the rear of point C relative to the forward movement of the vehicle. An analysis of the balance shows that the force Q generated by the surface 3 on the wheel 1 is identical with that illustrated by FIG. 4A. This figure illustrates a possible generalisation of the invention in which the instantaneous axis of rotation is a real one, that is to say arm 8 can go through (in this case passing over rail 35) surface 3. Obviously, this instantaneous axis may be virtual (in the case of two convergent rods) and may then be applied to a device in which a physical passing through of surface 3 cannot be achieved. In conclusion, the generalisation of FIG. 14 shows that, to obtain the expected results, the trace of the instantaneous axis of rotation through which the direction PC of the resultant of the forces applied by the ground to the wheel passes must be situated a zone of the plane containing the force F and perpendicular to surface 3 delimited by the trace 4a in this plane of the cone 4 of friction which is inclined towards force F on the wheel side and by the perpendicular to the surface 3 at point C, the direction of above-mentioned resultant PC being naturally contained in the cone of friction.

One of the principal advantages of the invention lies in the fact that the wheels 1, which are auxiliary ones in relation to standard wheels which, in addition to guiding, braking and propulsion, effect the support of a vehicle, do not constitute parasitic systems consuming power through resistance to rolling, when out of operation, being practically non-loaded in such a case.

The invention is not limited to the examples which have been mentioned above.

Other combinations are still possible. In this connection it should be noted that only the guiding function requires a pair of wheels, as propulsion and braking may be supplied by one wheel only, Finally, propulsion or braking may be individually, or both, effected by other known devices.

Finally, it finds an interesting application in all fields of industry relating to vehicles, carriers, and, generally, any self-propelled or drawn vehicle moving on land.

I claim:

1. A vehicle for moving along a path relative to a support surface, comprising:
   a frame;
   highly resiliently rigid means for supporting said frame at an essentially fixed distance from said support surface;
   at least one rotatable wheel contacting said support surface at a point of contact, said wheel being subject to external forces acting parallel or transverse to said path or both, and through said point of contact in the plane of said support surface, said support surface and said wheel having a known cone of friction with a half angle;
   means for supporting said at least one rotatable wheel for rotating movement about a substantially horizontal axis along said support surface; and
   hinged connection means extending between said frame and said means for supporting, for allowing said at least one wheel to swing in a plane substantially perpendicular to said support surface, said hinged connection means having a real or virtual axis of rotation which intersects planes, which are perpendicular to said support surface and contain the vectors of said external forces, at points of intersection above said support surface and beyond said point of contact in the direction of said external forces, and for causing the vectors of the resultant forces transmitted to said frame under the influence of said external forces to extend at resultant angles to a perpendicular from said support surface, said resultant angles being less than said half angle,
   wherein in response to said external forces acting at said point of contact, said at least one rotatable wheel is held constantly in contact with said support surface.

2. A vehicle according to claim 1, wherein said means for supporting said wheel enables said wheel to pivot about an axis substantially perpendicular to said support surface.

3. A vehicle according to claim 1, wherein said means for supporting said wheel transmits torque applied by said external forces.

4. A vehicle according to claim 1, wherein said means for supporting said wheel comprises a spindle for said at least one rotatable wheel, said spindle extending substantially in parallel with said support surface.

5. A vehicle according to claim 1, wherein said hinged connection means comprises a pair of convergent arms hinged to said means for supporting said wheel and to said frame, the intersection of the axes of said arms defining said virtual axis.

6. A vehicle according to claim 1, wherein said means for supporting said frame comprises a ground effect system.

7. A vehicle according to claim 1, wherein said hinged connection means comprises an arm attached to said means for supporting said wheel and pivoted to said frame, the pivot axis of said arm comprising said virtual axis.

8. A vehicle according to claim 7, wherein said arm is pivoted to said frame at two locations.

9. A vehicle for moving along a path relative to a support surface, comprising:
   a frame;
   highly resiliently rigid ground effect means for supporting said frame at an essentially fixed distance from said support surface;
   at least one rotatable wheel contacting said support surface at a point of contact, said wheel being subject to external forces acting parallel or transverse to said path, or both, through said point of contact in the plane of said support surface, said support surface and said wheel having a known cone of friction with a half angle;
   means for supporting said at least one rotatable wheel for rotating movement along said support surface and about a spindle extending substantially in parallel with said support surface, for transmitting torque applied by said external forces and for enabling said at least one wheel to pivot about an axis substantially perpendicular to said support surface;

hinged connection means, including a pair of convergent arms hinged to said means for supporting said wheel and to said frame, for allowing said at least one wheel to swing in a plane subestantially perpendicular to said support surface, the intersection of the axes of said arms defining a virtual axis of rotation which intersects planes, which are perpendicular to said support surface and contain the vectors of said external forces, at points of intersection above said support surface and beyond said point of contact in the direction of said external forces, and for causing the vectors of the resultant forces transmitted to said frame under the influence of said external forces to extend at resultant angles to a perpendicular from said support surface, said resultant angles being less than said half angle, wherein in response to said external forces acting at said point of contact, said at least one rotatable wheel is held constantly in contact with said support surface.

* * * * *